Feb. 25, 1958
M. J. BARRY ET AL  2,824,886
REGENERATION OF CUPROUS AMMONIUM SALT MATERIAL
Filed June 25, 1953
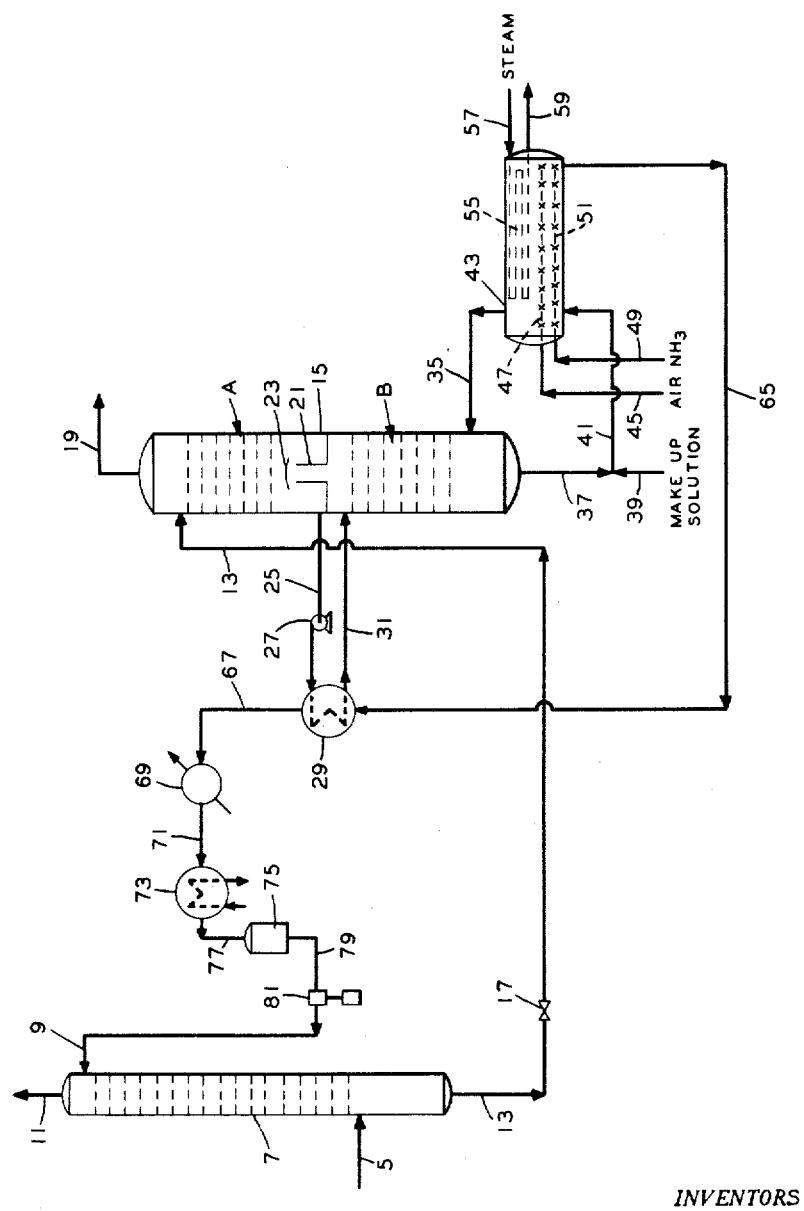
INVENTORS
MARTIN J. BARRY
THEODORE S. WILLIAMS
BY D. H. Palmer
T. C. Virgil
ATTORNEYS

United States Patent Office 2,824,886
Patented Feb. 25, 1958

1

2,824,886

REGENERATION OF CUPROUS AMMONIUM SALT MATERIAL

Martin J. Barry, Ridgewood, and Theodore S. Williams, Asbury Park, N. J., assignors to M. W. Kellogg Company, Jersey City, N. J., a corporation of of Delaware Application June 25, 1953, Serial No. 364,038

10 Claims. (Cl. 260—438)

This invention relates to improved method and means for regenerating a spent cuprous ammonium salt material, and more particularly pertains to improved method and means for regenerating cuprous ammonium salt material having associated therewith carbon monoxide and carbon dioxide such that the carbon oxides are dissociated therefrom in a very effective manner without a substantial loss in ammonia.

It is known that cuprous ammonium salts e. g. the acetate form are effective for the removal of carbon monoxide from a gaseous stream containing the same. Usually, the gaseous material containing the carbon monoxide is passed in countercurrent contact with the cuprous ammonium acetate and thereby the carbon monoxide is removed through a loose bond or coordination complex with the cuprous ammonium acetate. When the carbon monoxide containing gas has small amounts of carbon dioxide included therein, the carbon dioxide combines with the free ammonia contained in the cuprous ammonium acetate solution thus producing ammonium carbonate. In the regeneration of the spent cuprous ammonium acetate solution, it is necessary to subject the material to an elevated temperature in order to cause the carbon monoxide to dissociate therefrom, and also, the conditions are suitable for the decomposition of ammonium carbonate to ammonia and carbon dioxide gases. Care should be taken in the regeneration procedure in order to avoid excessive losses of ammonia which may readily occur at the elevated temperatures commonly used. The main advantage in the process of the present invention is the more effective removal of carbon oxides from the cuprous ammonium acetate material.

It is, therefore, an object of this invention to provide for the regeneration of spent cuprous ammonium salt material.

Another object of this invention is to provide improved method and means for the regeneration of cuprous ammonium salt material which is contaminated with carbon monoxide and with or without carbon dioxide.

A further object of this invention is to provide improved method and means for the regeneration of spent cuprous ammonium acetate material whereby the removal of carbon oxides is accomplished more effectively than heretofore known processes.

A still further object of this invention is to provide improved method and means for effectively removing substantially all of the carbon monoxide and carbon dioxide which is associated with cuprous ammonium acetate with a minimum loss of ammonia.

Other objects and advantages of this invention will become apparent from the following explanation and description thereof.

By means of this invention, it is contemplated regenerating a cuprous ammonium salt material which is spent with carbon monoxide by the method which comprises contacting the said spent cuprous ammonium salt material with an ammonia containing gas such that at least a part of the ammonia is absorbed thereby, contacting the thus enriched cuprous ammonium salt material with a gasiform stripping agent e. g. an ammonia containing gas at an elevated temperature such that a substantial amount of the carbon monoxide is dissociated or stripped from the cuprous ammonium salt and at least part of the ammonia is absorbed thereby, and further heating the enriched cuprous ammonium salt material in the presence of oxygen and ammonia under such conditions that substantially all of the carbon monoxide is dissociated therefrom. The cuprous ammonium salt can be any of the known types such as for example, cuprous ammonium formate, cuprous ammonium carbonate, cuprous ammonium nitrate, cuprous ammonium ethanolamine nitrate, etc.

In the absorption of carbon monoxide by means of cuprous ammonium salt, it is found that the carbon monoxide becomes associated by coordinate valence with the cuprous ammonium salt. In this manner, the carbon monoxide is selectively removed from a gaseous material comprised of other components, and then later the cuprous ammonium salt material is regenerated at an elevated temperature to dissociate the carbon monoxide. When the carbon monoxide containing gas has included therein carbon dioxide, it is found that the carbon dioxide combines with the free ammonia which is contained in the cuprous ammonium salt solution to form ammonium carbonate. Consequently, for the purpose of this specification and the appended claims, it is intended to employ the expression cuprous ammonium salt material in a generic sense to include the compound having carbon monoxide associated therewith, with or without ammonium carbonate.

In the practice of this invention, the spent cuprous ammonium salt material is first contacted with an ammonia containing gas in order that any of the free ammonia which has been removed therefrom during use can be replenished at a temperature suitable for this purpose. The ammonia containing gas can be pure ammonia, however, more usually, it is the ammonia containing gas which has been previously used for contact with the spent cuprous ammonium salt material under conditions whereby carbon monoxide alone or with carbon dioxide are stripped from the spent material. The absorption step of the regeneration process is generally conducted at a temperature of about 25° to about 150° F., preferably about 75° to about 100° F. This temperature is not particularly suitable for the absorption of carbon dioxide and/or carbon monoxide which may be included in the ammonia gas. The pressure which is employed for the absorption step, is generally about 5 to about 50 p. s. i. a., preferably about 15 to about 20 p. s. i. g. Higher pressures can be used, however, they are not recommended because there would be an undesired tendency for gaseous materials other than ammonia to be absorbed by the cuprous ammonium salt material. The relative quantities of ammonia containing gas and cuprous ammonium salt material can be varied over a wide range depending upon whether one or the other is more available for the absorption step. Normally, however, the cuprous ammonium salt material is contacted with about 25 to about 100 mols of ammonia per 10,000 gallons of cuprous ammonium salt material, based on the cuprous ammonium salt content. This absorption step can be conducted in a separate zone entirely removed or separated from any other operation involved in the practice of this invention. For example, a suitable fractionating tower equipped with bubble caps or a tower containing suitable packing, such as Raschig rings, can be employed for this purpose.

The cuprous ammonium salt material which has been previously used for the absorption of ammonia is then subjected to a stripping operation whereby substantial amounts of carbon monoxide with or without carbon dioxide are removed therefrom. This stripping operation is conducted under conditions whereby a substantial amount of the carbon monoxide is removed as such from the complex form. This stripping step is generally conducted at a temperature of about 100° to about 300° F., preferably about 150° to about 225° F. The pressure of the operation is usually at about 5 to about 50 p. s. i. a., more usually about 15 to about 20 p. s. i. a. Under these conditions, a significant amount of the carbon monoxide will become dissociated from the cuprous ammonium salt material. The stripping action is effected by means of the high temperature, but this effect is aided by a gasiform stripping agent e. g. ammonia containing gas coming into contact therewith at such temperatures. Usually, the quantity of cuprous ammonium salt relative to the amount of stripping agent e. g. ammonia can be varied over a wide range. The stripping agent can be pure ammonia or a gas containing ammonia and other components or any other kind of gas suitable for the purpose, usually, however, the ammonia containing gas is supplied from the decomposition step, which will be discussed hereinbelow, and this material contains ammonia, steam, oxygen, some carbon monoxide and carbon dioxide. Under the conditions existing within the stripping zone, when ammonia is contained in the stripping step, it is partly absorbed by the cuprous ammonium salt thus enrichening this material and thereby decreasing any loss thereof. While the relative quantities of the stripping gas, e. g. ammonia and the cuprous ammonium salt material can vary considerably, it is found, generally, that about 25 to about 100 mols of ammonia containing gas, based on ammonia, per 10,000 gallons of cuprous ammonium salt material are used. The stripping operation may be conducted in a vessel which is separate from other processing zones and to which the necessary material is charged. This vessel may be a fractionating tower of the bubble type or a packed column containing e. g., Raschig rings, etc.

The cuprous ammonium salt material which has been previously stripped is then passed into what is known hereunder as the decomposition zone. In this decomposition zone, severe conditions of treatment are employed to insure that substantially all of the carbon monoxide with or without substantially all of the carbon dioxide associated with the cuprous ammonium salt material is released therefrom. In view of the conditions employed in this step, there is a tendency for the cuprous ammonium salt material containing associated carbon monoxide to undergo undue reduction reaction in which cuprous ions are converted to metallic copper and the carbon monoxide is oxidized to carbon dioxide. To avoid the reduction to metallic copper, the decomposition reaction is effected in the presence of a small amount of oxygen which can be supplied as an oxygen containing gas, such as for example, air, oxygen, etc. The oxygen serves to oxidize a part of the cuprous ion to the cupric ion and thus eliminate substantially the possibility of forming metallic copper. Usually, for the purposes of this invention, the oxygen present during the decomposition step is sufficient to maintain about 5 to about 50% of the copper present in the form of cupric ions, preferably about 15 to about 30%, on the same basis. The ammonia gas which is charged to this step serves to replenish any of the ammonia which is lost in the complete operation. While ammonia is picked up by the cuprous ammonium salt in the absorption and stripping zones, it is important to contact further the cuprous ammonium salt material with an ammonia containing gas in the decomposition step. This ammonia containing gas can be pure ammonia or ammonia having included therein other component materials. The ammonia containing gas which has been contacted with the cuprous ammonium salt material in the decomposition zone is then circulated to the stripping zone, as the gasiform stripping agent for that operation, and then in turn, the ammonia containing gas leaving the stripping zone can be circulated to the absorption zone for the same purpose. Consequently the ammonia containing gas supplied to the decomposition zone should be sufficient to make up any ammonia which is lost as a result of all the operations in which the cuprous ammonium salt material is used. In this decomposition operation, generally, a temperature of about 125° to about 350° F., preferably about 160° to about 250° F. is employed. A pressure in the order of about 5 to about 50 p. s. i. a., preferably about 15 to about 20 p. s. i. a. is used along with the temperature specified in order to promote the dissociation and/or oxidation of carbon monoxide, with or without the dissociation of carbon dioxide from ammonium carbonate. This decomposition reaction is characterized by long residence times in order to have substantially all of the carbon dioxide liberated from the ammonium carbonate. The residence time of the cuprous ammonium salt material in the decomposition step is generally about 0.25 to about 3 hours, preferably about 0.5 to about 2 hours. This residence time is relatively long compared to those used in the stripping and absorption steps. In the stripping operation, generally, a residence time of about 1 minute to about 1 hour, preferably about 5 to about 20 minutes, is used; whereas in the absorption operation, a residence time of about 1 minute to about 1 hour, preferably about 5 to about 20 minutes of the cuprous ammonium salt material is employed. The quantity of ammonia containing gas relative to the cuprous ammonium salt material in the decomposition step can vary widely over a large range, usually, however, about 25 to about 100 mols of ammonia containing gas per 10,000 gallons of cuprous ammonium salt are employed.

It will be noted that the conditions employed in the decomposition step are more severe than the conditions used in the stripping step. The severe conditions are generally reflected in the use of a higher temperature for the decomposition operation than the temperature used in the stripping operation. Furthermore, it is desirable to maintain the temperature of the absorption step at a low level relative to the other processing zones in order to insure a greater absorption of ammonia than any other gaseous material which may be included therewith. In this regard, unusually high pressures are to be avoided because at such pressures, there is a strong tendency for other gases as well as ammonia to be absorbed by the cuprous ammonium salt material. In each of the three steps described above, it is to be noted that ammonia is always present in order to insure that the regenerated cuprous ammonium salt material contains sufficient ammonia in coordination for effective use in absorption of carbon monoxide.

The stripping step constitutes an important part of the present invention. In processes practiced heretofore it was customary to regenerate the cuprous ammonium salt material without a stripping operation. The absence of a stripping step results in a regenerated material having a higher ammonium carbonate content, and also, a higher loss or consumption of ammonia. The higher concentration of ammonium carbonate in the regenerated solution tends to increase the tendency for producing carbamates in the ammonia synthesis zone. By means of the stripping operation in the present invention these defects are substantially minimized by reducing the amount of carbon dioxide produced in the total regeneration procedure. The stripping step effects a substantial removal of carbon monoxide held in complex formation with the cuprous ammonium salt material as carbon monoxide rather than the dioxide. In this stripping operation, the ammonia containing gas from the decomposition zone is employed as the gasiform stripping agent, thus eliminating the need for an extraneous source of gaseous material. Further, the stripping step involves a lower temperature than the decomposition such that the oxidation of carbon monoxide is less favored. In effect, the decomposition step regenerates the cuprous ammonium salt material under such conditions that the carbon monoxide held in complex formation is converted to carbon dioxide, and carbon dioxide is released by reason that the salt material will not hold it in complex formation. Any carbon monoxide which is released as such from the salt material is apt to be converted to carbon dioxide in the oxidizing atmosphere of the decomposition zone. This effect is also enhanced in the decomposition step by reason of the greater temperature employed therein. In the stripping step, the regeneration of cuprous ammonium salt material is effected primarily by the production of carbon monoxide as such. The gasiform stripping agent in combination with suitable temperature conditions serves to strip out the carbon monoxide. The temperature in the stripping operation has less of a tendency to effect the oxidation of carbon monoxide.

It should be noted that the stripping step is preferably conducted by contacting the spent cuprous ammonium salt material countercurrently with the gasiform stripping agent. By this method, the spent solution of cuprous ammonium salt material is contacted by progressive stages with a gasiform stripping agent of decreasing carbon monoxide concentration, thus promoting rapid transfer or dissociation of carbon monoxide from the spent solution. Another advantage is that by rapid removal of carbon monoxide from the spent solution, there is less chance for oxidation-reduction reaction between carbon monoxide and cuprous ion to take place, which would result in the oxidation of carbon monoxide to carbon dioxide and the reduction of cuprous ions to metallic copper. In a co-current stripping operation, on the other hand, the spent solution is always in contact with a high concentration of carbon monoxide in the stripping gas, thus resulting in a regenerated solution of higher carbon monoxide content. Further, by reason of the high concentration of carbon monoxide in the stripping agent, the rate of transfer of dissociated carbon monoxide to the stripping gas tends to increase the oxidation-reduction reactions discussed above to a greater extent than the countercurrent operation.

For a better understanding of this invention, reference will be had to the accompanying drawing which serves to illustrate a specific embodiment thereof.

In the drawing, a carbon monoxide containing gaseous material, having the composition of ingredients and in the amounts specified below, was charged by means of a supply line 5 to an absorption tower 7:

| Components: | Lb./hr. |
|---|---|
| $H_2$ | 2,608 |
| $N_2$ | 12,184 |
| CO | 1,008 |
| A | 224 |
| $CH_4$ | 56 |
| $H_2O$ | 150 |
| Total | 16,230 |

The absorption tower 7 is a fractionating tower of the bubble type, however, it may also be a packed column containing Berl saddles or Raschig rings. To the top part of absorption tower 7 there is charged via a line 9 a cuprous ammonium acetate material having the composition given below and in the amounts specified:

| Components: | Lb./hr. |
|---|---|
| Copper | 8,850 |
| Ammonia | 9,030 |
| Acetic acid | 13,620 |
| Water | 57,000 |
| Total | 88,500 |

As a result of countercurrent contact between the inflowing carbon monoxide containing gaseous material, a substantial amount of carbon monoxide is removed from the gaseous stream and this gaseous stream is yielded overhead from the top of the absorption tower by means of a line 11. The overhead stream leaving the absorption tower has the following composition and in the amounts specified below:

| Components: | Lb./hr. |
|---|---|
| $H_2$ | 2,599 |
| $N_2$ | 12,142 |
| A | 224 |
| $CH_4$ | 56 |
| $H_2O$ | 2 |
| Total | 15,023 |

The cuprous ammonium acetate material enriched with carbon monoxide is discharged from the bottom of the absorption tower by means of a line 13 and this line is connected to the top part of absorption section A of tower 15. The spent cuprous ammonium acetate material has the composition given below:

| Components: | Lb./hr. |
|---|---|
| Copper | 8,850 |
| Ammonia | 9,030 |
| Acetic acid | 13,620 |
| Water | 57,000 |
| Carbon monoxide | 1,008 |
| Total | 89,508 |

The absorption column 7 is operated by having the carbon monoxide containing gaseous material enter via line 5 at a temperature of 100° F. and a pressure of 2118 p. s. i. g. The cuprous ammonium acetate material is fed to the top of the absorption tower at a temperature of 32° F. and a pressure of 2158 p. s. i. g. The absorption of carbon monoxide is exothermic, consequently, the resultant temperature at the bottom of the absorption tower is 63° F. and the pressure is 2117 p. s. i. g. The pressure at the top of the absorption tower is 2111 p. s. i. g.

The spent cuprous ammonium acetate material is depressured by means of a valve 17, which is located in line 13, and which line connects the bottom of the absorption tower to the top part of tower 15. In the absorption section A, the spent cuprous ammonium acetate material flows downwardly in counter-current contact with an ammonia containing gas stream at a temperature of 100° F. and at a pressure of 6 p. s. i. g. After contact with the cuprous ammonium acetate material, the ammonia containing gas, substantially reduced in ammonia content, is discharged overhead from the top of section A through a line 19. This discharged gaseous material has the composition given below:

| Components: | Lb./hr. |
|---|---|
| $H_2$ | 32 |
| $N_2$ | 451 |
| CO | 1,050 |
| A | 68 |
| $CH_4$ | 14 |
| $CO_2$ | 246 |
| $NH_3$ | 110 |
| $H_2O$ | 124 |
| Total | 2,095 |

In the middle section of tower 15 there is situated a doughnut tray above which there is superposed a baffle 23. Any gaseous materials leaving stripping section B pass through the opening of the doughnut tray and impinge against baffle 23 in order that any liquid entrained therewith may be returned to the stripping section. After the cuprous ammonium acetate material has been contacted with the ammonia containing gas in the absorption section A, it is collected on the doughnut tray, withdrawn therefrom by means of a line 25, and then transported by means of pump 27 through a heat exchanger 29. The temperature of the cuprous ammonium acetate material which is withdrawn from the doughnut tray via line 25 is 120° F. As a result of being heated in heat exchanger 29, the temperature is raised to 158° F., and this material is then passed by means of a line 31 to the top part of stripping section B. In the stripping section B, the heated cuprous ammonium acetate material flows downwardly in countercurrent contact with an upflowing gaseous stream containing ammonia. This ammonia containing gas is fed to the bottom part of stripping section B by means of line 35. The temperature at the bottom of the stripping section is 170° F.

The stripped cuprous ammonium acetate solution is withdrawn from the bottom of stripping section B by means of a line 37. Make up solution of cuprous ammonium acetate material is fed into line 37 from source 39 and it has the composition given below:

| Components: | Lb./hr. |
| --- | --- |
| Copper | 30 |
| Ammonia | 30 |
| Acetic acid | 46 |
| Water | 194 |
| Total | 300 |

The combined streams are passed through a line 41 and thence into one end of the bottom of a decomposition vessel 43. Into the bottom part of the decomposition vessel 43 there is supplied air from a source 45 at the rate of 84.5 cubic feet per minute (measured at 60° F. and 760 mm.). This air is discharged into the bottom part of decomposition vessel 43 by means of a distributor 47. Ammonia containing gas is supplied from a source 49 having the composition and at the rate given below:

| Components: | Lb./hr. |
| --- | --- |
| $H_2$ | 23 |
| $N_2$ | 115 |
| A | 68 |
| $CH_4$ | 14 |
| $NH_3$ | 110 |
| Total | 330 |

This ammonia containing gas is discharged into the bottom part of decomposition vessel 43 by means of a distributor 51. The temperature in the decomposition vessel 43 is maintained by means of a steam coil 55, into which live steam is fed by means of a line 57, and condensate is withdrawn therefrom via a line 59. The temperature in the decomposition vessel is maintained at 180° F. and at a pressure of 8 p. s. i. g.

The regenerated cuprous ammonium acetate material is withdrawn from the bottom end of the decomposition vessel 43 by means of a line 65. The regenerated material is then passed to heat exchanger 29 as a result of which the temperature is reduced to 141° F. The regenerated material leaves the heat exchanger 29 by means of line 67, and it then flows to a cooler 69 in which the temperature is further decreased to 80° F. The regenerated material passes from cooler 69 by means of a line 71 and then enters a liquid ammonia refrigerator 73. The temperature of the regenerated material is then reduced to 32° F., and it flows from refrigerator 73 to a filter shown schematically as 75 by means of a line 77. The filtered cuprous ammonium acetate material passes from the filter into a line 79, after which it is transported by means of a pump 81 through line 9, which is connected to the top of the absorption tower 7.

Having thus described our invention by reference to specific examples, it should be understood that no undue limitations or restrictions are to be imposed by reason thereof, but that the present invention is defined by the appended claims.

We claim:

1. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; and heating the thus-stripped solution to a temperature of about 125° F. to about 350° F. to dissociate additional carbon monoxide from said solution.

2. The process for the removal of carbon monoxide from a solution of a cuprous ammonium salt containing the same which comprises: contacting said solution with an ammonia-containing gas in an absorption zone at a temperature of about 75° F. to about 100° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; and heating the thus-stripped solution to a temperature of about 125° F. to about 350° F. to dissociate additional carbon monoxide from said solution.

3. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 150° F. to about 225° F. such that at least part of the carbon monoxide is dissociated from the cuprous ammonium salt; and heating the thus-stripped solution to a temperature of about 125° F. to about 350° F. to dissociate additional carbon monoxide from said solution.

4. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; and heating the thus-stripped solution to a temperature of about 160° F. to about 250° F. to dissociate additional carbon monoxide from said solution.

5. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a stripping agent comprising an ammonia-containing gas; countercurrently contacting the enriched solution from the absorption zone with said stripping agent in said stripping zone at a temperature of about 100° F. to about 300° F. such that at least part of the carbon monoxide is dissociated from the cuprous ammonium salt; and heating the thus-stripped solution to a temperature of about 125° F. to about 350° F. to dissociate additional carbon monoxide from said solution.

6. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; and heating the thus-stripped solution in the presence of an ammonia-containing gas including oxygen to a temperature of about 125° F. to about 350° F. to dissociate additional carbon monoxide from said solution, without the formation of metallic copper.

7. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; heating the thus-stripped solution in the presence of an ammonia-containing gas including oxygen in a decomposition zone to a temperature of about 125° F. to about 350° F. to dissociate additional carbon monoxide from said solution, without the formation of metallic copper; and passing ammonia-containing gas from said decomposition zone to said stripping zone.

8. The process for the removal of carbon monoxide from a solution of a cuprous ammonium salt containing the same which comprises: contacting said solution with an ammonia-containing gas in an absorption zone at a temperature of about 25° F. to about 150° F. to absorb at least part of the ammonia; passing the thus-enriched solution to a stripping zone; introducing into said stripping zone a gasiform stripping agent; countercurrently contacting the enriched solution from the absorption zone with said stripping agent in said stripping zone at a temperature of about 100° F. to about 300° F. such that at least part of the carbon monoxide is dissociated from the cuprous ammonium salt; heating the thus-stripped solution in a decomposition zone to a temperature of about 125° F. to about 350° F. to dissociate additional carbon monoxide from said solution; withdrawing the thus-treated stripped solution from said decomposition zone; and contacting the aforementioned enriched solution withdrawn from the absorption zone with said stripped solution from said decomposition zone.

9. The process according to claim 1 in which the cuprous ammonium salt is cuprous ammonium acetate.

10. The process according to claim 1 in which substantially all of the carbon monoxide is removed from the cuprous ammonium salt solution.

References Cited in the file of this patent
UNITED STATES PATENTS

| | | |
|---|---|---|
| 2,029,411 | Christensen | Feb. 4, 1936 |
| 2,047,550 | Dely | July 14, 1936 |
| 2,455,473 | Dely | Dec. 7, 1948 |